US007822512B2

(12) United States Patent
Thatcher et al.

(10) Patent No.: US 7,822,512 B2
(45) Date of Patent: Oct. 26, 2010

(54) METHODS AND SYSTEMS FOR PROVIDING REAL-TIME COMPARISON WITH AN ALTERNATE CONTROL STRATEGY FOR A TURBINE

(75) Inventors: Jonathan Carl Thatcher, Liberty, SC (US); Scott Schaberg, Greenville, SC (US); Mark Disch, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 444 days.

(21) Appl. No.: 11/971,007

(22) Filed: Jan. 8, 2008

(65) Prior Publication Data

US 2009/0173078 A1 Jul. 9, 2009

(51) Int. Cl.
*G05B 13/02* (2006.01)
(52) U.S. Cl. ............................ 700/287; 700/30; 700/31
(58) Field of Classification Search .................. 700/29, 700/30, 31, 287, 289, 290
See application file for complete search history.

(56) References Cited

U.S. PATENT DOCUMENTS

| 4,423,594 | A | | 1/1984 | Ellis | |
|---|---|---|---|---|---|
| 4,494,207 | A | * | 1/1985 | Chang et al. | 700/290 |
| 4,577,270 | A | * | 3/1986 | Sugano et al. | 700/31 |
| 5,189,620 | A | | 2/1993 | Parsons et al. | |
| 6,804,612 | B2 | * | 10/2004 | Chow et al. | 702/34 |
| 6,823,253 | B2 | | 11/2004 | Brunell | |
| 6,823,675 | B2 | | 11/2004 | Brunell et al. | |
| 7,020,595 | B1 | * | 3/2006 | Adibhatla et al. | 703/7 |
| 7,503,177 | B2 | | 3/2009 | Bland et al. | |
| 7,584,617 | B2 | | 9/2009 | Bland et al. | |
| 7,620,461 | B2 | * | 11/2009 | Frederick et al. | 700/30 |
| 2002/0016640 | A1 | * | 2/2002 | Gagne | 700/29 |
| 2004/0088060 | A1 | * | 5/2004 | Renou et al. | 700/30 |
| 2004/0211187 | A1 | | 10/2004 | Catharine et al. | |
| 2005/0193739 | A1 | | 9/2005 | Brunell | |
| 2006/0248893 | A1 | | 11/2006 | Mick et al. | |
| 2007/0062196 | A1 | | 3/2007 | Gleeson et al. | |
| 2007/0214796 | A1 | | 9/2007 | Bland et al. | |
| 2008/0178600 | A1 | * | 7/2008 | Healy et al. | 60/773 |
| 2009/0005952 | A1 | | 1/2009 | Tonno et al. | |
| 2009/0320493 | A1 | * | 12/2009 | Olia et al. | 60/773 |

* cited by examiner

*Primary Examiner*—Ryan A Jarrett
(74) *Attorney, Agent, or Firm*—Sutherland Asbill & Brennan LLP (57) ABSTRACT

A method for controlling and modeling a turbine is provided. The method may include modeling the turbine by a primary adaptive turbine model that includes at least one primary operating parameter and modeling the turbine by an alternate adaptive turbine model that includes at least one alternate operating parameter. The method may also include determining a first output value from the primary adaptive turbine model that corresponds at least in part to the operation of the turbine based on a primary control strategy and adjusting the alternate operating parameter or parameters based on an alternate control strategy and based at least in part on the first output value. The method may further include determining comparison data based at least in part on a comparison between the primary control strategy and the alternate control strategy.

20 Claims, 5 Drawing Sheets

METHODS AND SYSTEMS FOR PROVIDING REAL-TIME COMPARISON WITH AN ALTERNATE CONTROL STRATEGY FOR A TURBINE

TECHNICAL FIELD

The invention relates generally to turbine control systems, and more particularly relates to providing methods and systems for providing real-time comparison with an alternate control strategy for a turbine.

BACKGROUND OF THE INVENTION

Industrial and power generation turbines have control systems ("controllers") that monitor and control their operation. These controllers govern the combustion system of the turbine and other operational aspects of the turbine. The controller may execute scheduling algorithms that adjust the fuel flow, inlet guide vanes (IGV) and other control inputs to ensure safe and efficient operation of the turbine.

Turbine controllers may receive input values of measured operating parameters and desired operating settings, that in conjunction with scheduling algorithms, determine settings for control parameters to achieve the desired operation. The values prescribed by the scheduling algorithms for the control parameters may cause the turbine to operate at a desired state, such as at a desired power output level and within defined emission limits. The scheduling algorithms incorporate assumptions regarding the turbine, such as that it is operating at a certain efficiency, with a certain flow capacity and at other assumed conditions.

As the turbine operates for an extended period, component efficiencies tend to degrade, and flow capacities and other operating conditions may vary from the assumed conditions. Because of this deterioration, the control scheduling algorithms may become increasingly out of tune and cause the turbine to operate at states that increasingly diverge from the desired operational state.

In response, turbine control systems have been developed that employ adaptive turbine models to estimate certain operating parameters of an operating turbine. The models may estimate operational parameters that are not directly sensed (or measured) by sensors for use in control algorithms. The models may also estimate operational parameters that are measured so that the estimated and measured conditions can be compared. The comparison may be used to automatically tune the model while the turbine continues to operate.

Accordingly, a turbine controlled by an adaptive turbine model may experience operational efficiencies by utilizing a model that is automatically tuned to the actual operating conditions of the turbine, thus allowing the control of the turbine to directly reflect the state of the turbine and operate efficiently and/or to its maximum thresholds. These operational efficiencies may produce significant benefits over the turbine operating under or based on the legacy control system, though it may be difficult to quantify the benefits realized without a means to compare the turbine operating based on the new control system including an adaptive turbine model to the turbine, in its present state, as it would be operating based on a legacy control system.

Furthermore, an adaptive turbine model, because of its ability to be tuned real-time, or in near-real-time, to reflect the operational state, and because of the flexibility it provides for controlling the turbine, may be useful to predict the turbine operation under operating conditions and control strategies and strategies different than those that exist for the turbine. Doing so may allow for determining an alternate control strategy.

However, to accomplish analyzing the turbine based on an alternate control strategy, while the turbine is in operation based on another control strategy, for example an upgraded control system, or an actual control strategy given the desired goals, ambient conditions, or system status, current control systems utilizing a single turbine model may not be used because the model is responsive to the control parameters and/or control outputs of actual operation of the turbine.

Thus, there exists a need for a control system including an alternate adaptive model that is tuned to the operating conditions and status of the turbine but where the alternate control system may be analyzed based on a control strategy different than that used for actual turbine control.

Further, there is a need for methods and systems for providing real-time comparison with an alternate control strategy for a turbine.

BRIEF DESCRIPTION OF THE INVENTION

Embodiments of the invention can address some or all of the needs described above. Embodiments of the invention are directed generally to methods and systems for providing real-time comparison with an alternate control strategy for a turbine. The methods and systems may include an alternate adaptive turbine model that allows quantifying operational differences of the an actual turbine, comparing the turbine operating based on the actual (or primary) control strategy to the turbine modeled as if it were operating based on an alternate control strategy. Additionally, these the methods and systems herein may provide for adjusting the actual turbine control based at least in part on an analysis of the alternate adaptive turbine model modeling operation based on the alternate control strategy.

According to one example embodiment of the invention, a method for controlling and modeling a turbine is provided. The method may include modeling the turbine by a primary adaptive turbine model that includes at least one primary operating parameter and modeling the turbine by an alternate adaptive turbine model that includes at least one alternate operating parameter. The method may also include determining a first output value from the primary adaptive turbine model that corresponds at least in part to the operation of the turbine based on a primary control strategy and adjusting the alternate operating parameter or parameters based on an alternate control strategy and based at least in part on the first output value. The method may further include determining comparison data based at least in part on a comparison between the primary control strategy and the alternate control strategy.

According to another example embodiment of the invention, a turbine control and modeling system is provided. The system may include a primary adaptive turbine model operable to model the operation of a turbine. The primary adaptive turbine model may include at least one primary operating parameter. The system may further include an alternate adaptive turbine model operable to model the operation of the same turbine. The alternate adaptive turbine model may include at least one alternate operating parameter. The system described may be operable to determine a first output value from the primary adaptive turbine model associated at least in part with the operation of the turbine and to adjust the one or more alternate operating parameters based on an alternate control strategy and based at least in part on the first output value. The system described may also be operable to determine comparison data based at least in part on a comparison between the primary control strategy and an alternate control strategy.

According to yet another example embodiment of the invention, a method for controlling and modeling a turbine is provided. The method may include modeling the turbine using a primary adaptive turbine model that includes at least one primary operating parameter and modeling the turbine using an alternate adaptive turbine model that includes at least one alternate operating parameter. The method may further include tuning the primary adaptive turbine model and the alternate adaptive turbine model. In the method, when the turbine is operating at part load based on a primary control strategy, the alternate operating parameter or parameters may be adjusted to determine an alternate power output based on an alternate control strategy that is substantially equal to the turbine power output. The primary operating parameter or parameters may be compared to the at least one alternate operating parameter. In the method, when the turbine is operating at base load based on the primary control strategy, the alternate operating parameter or parameters may be adjusted to determine an alternate maximum power output based on the alternate control strategy. The maximum turbine power output associated with the turbine may be compared to the alternate maximum power output.

Other embodiments and aspects of the invention will become apparent from the following description taken in conjunction with the following drawings.

DETAILED DESCRIPTION OF THE INVENTION

Example embodiments of the invention now will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

According to an example embodiment of the invention, a turbine control system may include a first adaptive turbine model, for example, a primary adaptive turbine model or an actual adaptive turbine model, and a second adaptive turbine model, for example, an alternate adaptive turbine model. The alternate adaptive turbine model may be a second instantiation of the first adaptive turbine model, both of which are tuned to mathematically model the same turbine to which they are associated. As a part of this mathematical modeling, the adaptive turbine models may receive as model inputs the real time operating status and real time operating parameters of the turbine, as well as estimate operating parameters that may not be directly sensed, so as to substantially reflect the actual state of the turbine in real time or near-real time.

A description of the adaptive turbine model, which may be used to generally describe the first, or primary, adaptive turbine model and the second, or alternate, adaptive turbine model, is provided. The adaptive turbine model can receive measured conditions as model input parameters, for example, but not limited to, the ambient pressure, the compressor inlet guide vane position, the fuel flow, the inlet bleed heat flow, the generator power losses, the inlet and exhaust duct pressure losses, and the compressor inlet temperature. The adaptive turbine model can determine estimated operating parameters, for example, but not limited to, the exhaust gas temperature, the compressor discharge pressure and temperature, and the power output. The estimated operating parameters, which may also be referred to as model outputs, may be used in conjunction with the measured operating parameters to determine appropriate control actions. For example, the measured and estimated operating parameters (collectively, the model outputs) may be input to control schedules to determine the gas turbine operating state, such as, but not limited to, the desired turbine exhaust temperature, the total combustor fuel flow, the fuel split schedules, and the inlet bleed heat flow. In addition, the model outputs may be used to evaluate the accuracy of the model and to tune the model.

The gas turbine model may be regularly, automatically, in real-time, and/or in near-real-time tuned using a Kalman filter. The Kalman filter may receive, as inputs, signals indicating the differences between measured gas turbine parameters from various sensors and the estimated parameters output from the model. The Kalman filter also may receive as input the Kalman filter gain matrix (KFGM), which is an array of numbers representing the uncertainty weighted sensitivity of model estimated parameters to changes in model performance multipliers. The Kalman filter may use the supplied inputs to determine or otherwise generate performance multipliers that are applied to tune the model and increase the accuracy of the estimated gas turbine parameters.

The KFGM may be calculated by an array of mathematical equations. These equations can receive as inputs a model sensitivity matrix (MSM) and estimates of the model and measurement uncertainty. The MSM may be calculated on-line in real-time, or near-real-time, by perturbation and evaluation of the adaptive turbine model. The Kalman filter optimizes the multiplier values to minimize the differences between the estimated and measured operating parameters.

The adaptive turbine model may be adaptive to changing efficiencies, flow capacities, and other parameters of the actual turbine. The output performance multipliers determined by the Kalman filter adapt the model to better match the measured parameters of the turbine. The Kalman filter may tune the model to, for example, account for deterioration of component efficiencies and changes in air-flow capacities of the turbine that occur during extended operation.

Since the MSM and KFGM may be calculated on-line and in real-time, or near-real-time, the Kalman filter structure is able to adapt to changes in the number of available sensors and type of measured output parameters available to compare to the estimated output parameters of the model. When an operating parameter of the turbine is no longer being measured, such as due to a sensor failure, the Kalman filter structure may be modified to account for the loss of the measured parameter, and may continue to determine performance multipliers based on the remaining measured conditions of the turbine.

In an embodiment of the invention, the control system may include at least two adaptive turbine models. Each model can be configured so as to be identical models of the same turbine and to be contemporaneously and consistently tuned as described herein. While the first adaptive turbine model may be used to generate control actions to control the turbine, the second adaptive turbine model may be used to analyze turbine control based on an alternate control strategy. Analyzing the turbine control based on an alternate control strategy may be performed, for example, to compare current turbine control and efficiencies when controlled by a current, upgraded control system as compared to a legacy control system, whereas the legacy control system may serve as the alternate control strategy to which the second, alternate adaptive model may be controlled.

Figure 1:
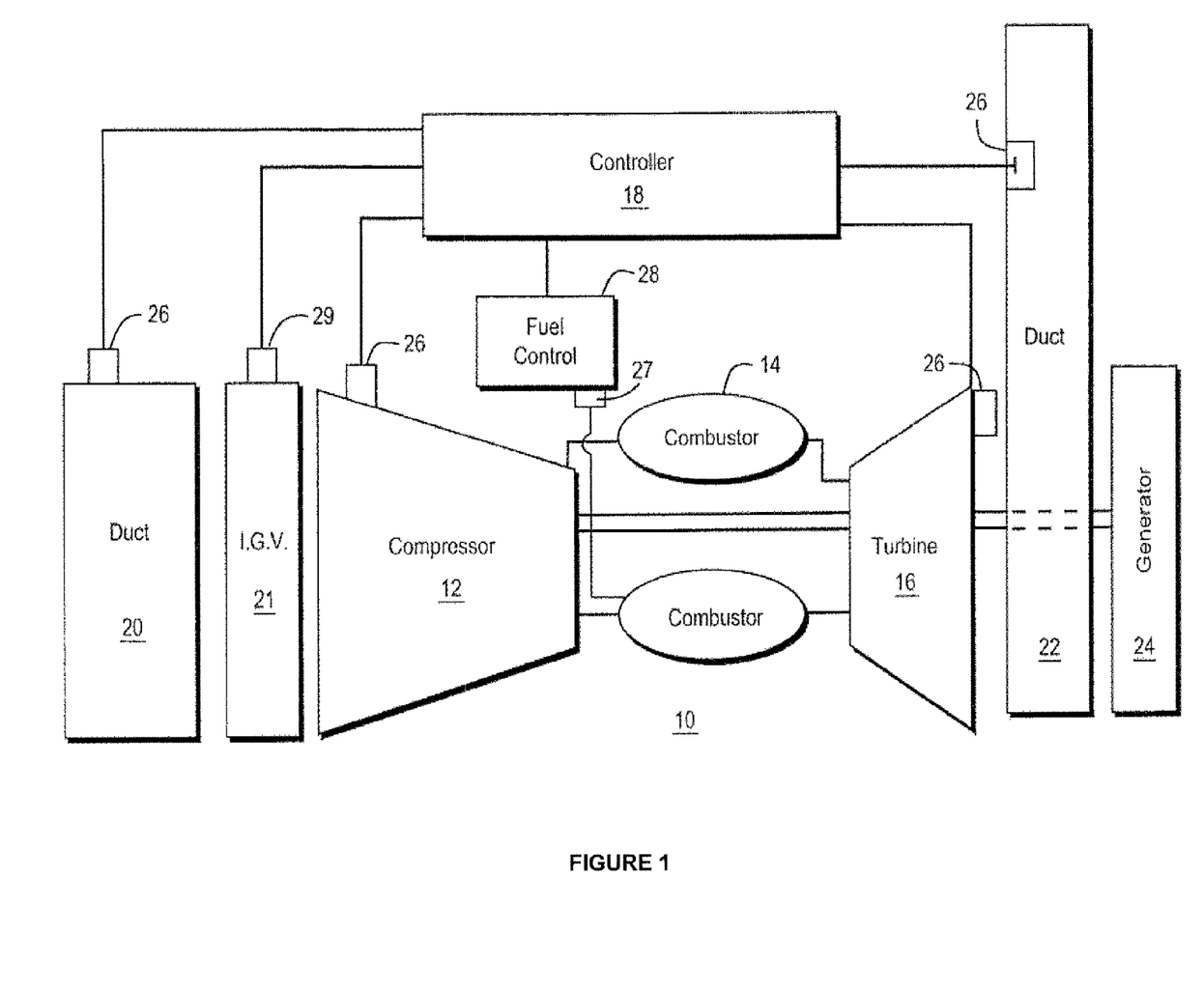
FIG. 1 is an example block diagram of a turbine as used with embodiments of the invention.

FIG. 1 depicts an example turbine 10, for example a gas turbine, having a compressor 12, combustor 14, turbine 16 drivingly coupled to the compressor 12, and a control system, or controller, 18. An inlet duct 20 to the compressor 12 feeds ambient air and possibly injected water to the compressor 12. The inlet duct 20 may have, for example, ducts, filters, screens, and sound absorbing devices that contribute to a pressure loss of ambient air flowing through the inlet duct 20 into inlet guide vanes 21 of the compressor 12. An exhaust duct 22 for the turbine 10 directs combustion gases from the outlet of the turbine 10 through, for example, emission control and sound absorbing devices. The exhaust duct 22 may include, for example, sound absorbing materials and emission control devices that apply a backpressure to the turbine 10. The amount of inlet pressure loss and back pressure may vary over time due to the addition of components to the inlet and exhaust ducts 20, 22, and due to clogging of the inlet and exhaust ducts 20, 22, for example from dust and dirt. The turbine 10 may drive a generator 24 that produces electrical power. The inlet loss to the compressor and the turbine exhaust pressure loss tend to be a function of corrected flow through the gas turbine.

The operation of the example turbine 10 may be monitored by one or more sensors 26 detecting one or more observable conditions, or operating parameters, of the turbine 10, the generator 24, and the ambient environment. In many instances, two or three redundant sensors may measure the same measured condition. For example, groups of three redundant temperature sensors 26 may monitor ambient temperature surrounding the turbine, the compressor discharge temperature, the turbine exhaust gas temperature, and other temperature measurements through the turbine. Similarly, groups of three redundant pressure sensors 26 may monitor the ambient pressure, and the static and dynamic pressure levels at the compressor inlet and outlet, at the turbine exhaust, at other locations through the turbine. Groups of three redundant humidity sensors 26, for example, wet and dry bulb thermometers, measure ambient humidity in the inlet duct of the compressor. Groups of three redundant sensors 26 may also comprise flow sensors, speed sensors, flame detector sensors, valve position sensors, guide vane angle sensors, or the like that sense various parameters pertinent to the operation of turbine 10.

As used herein, "parameters" (or "operating parameters") refer to items that can be used to define the operating conditions of the turbine, such as, but not limited to, temperatures, pressures, and gas flows at defined locations in the turbine. Some parameters are measured—they are capable of being sensed and may be directly known. Other parameters are estimated by the adaptive turbine models and are indirectly known. The measured and estimated parameters may be used to represent a given turbine operating state.

A fuel control system 28 may regulate the fuel flowing from a fuel supply to the combustor 14. The fuel controller may also select the type of fuel for the combustor 14. The fuel control system 28 may be a separate unit or may be a component of the main controller 18.

The controller 18 may be a computer system having one or more processor that execute programs to control the operation of the turbine. The control may depend on, for example, sensor inputs or instructions from human operators. The programs executed by the controller 18 may include, for example, scheduling algorithms, such as those for regulating fuel flow to the combustor 14. The commands generated by the controller 18 can cause actuators on the turbine to, for example, adjust valves via an actuator 27 between the fuel supply and combustors that regulate the flow, fuel splits and type of fuel flowing to the combustors, adjust inlet guide vanes 21 on the compressor via an actuator 29, or activate other control settings on the turbine.

The scheduling algorithms can enable the controller 18 to maintain, for example, the nitrogen oxide (NOx) and carbon monoxide (CO) emissions in the turbine exhaust to within certain predefined emission limits, and to maintain the combustor firing temperature to within predefined temperature limits. The scheduling algorithms may have inputs for parameter variables such as, but not limited to: current compressor pressure ratio, ambient specific humidity, inlet pressure loss, and turbine exhaust back pressure. The control system 18 applies the algorithms to schedule the gas turbine, for example, to set desired turbine exhaust temperatures and combustor fuel splits, so as to satisfy performance objectives while complying with operability boundaries of the turbine. In one example embodiment, the scheduling algorithms may be defined by operational boundaries that employ physics based models or transfer functions that provide boundary control causing the turbine to operate in its optimum state, minimizing the deviation from the boundary levels.

Figure 2:
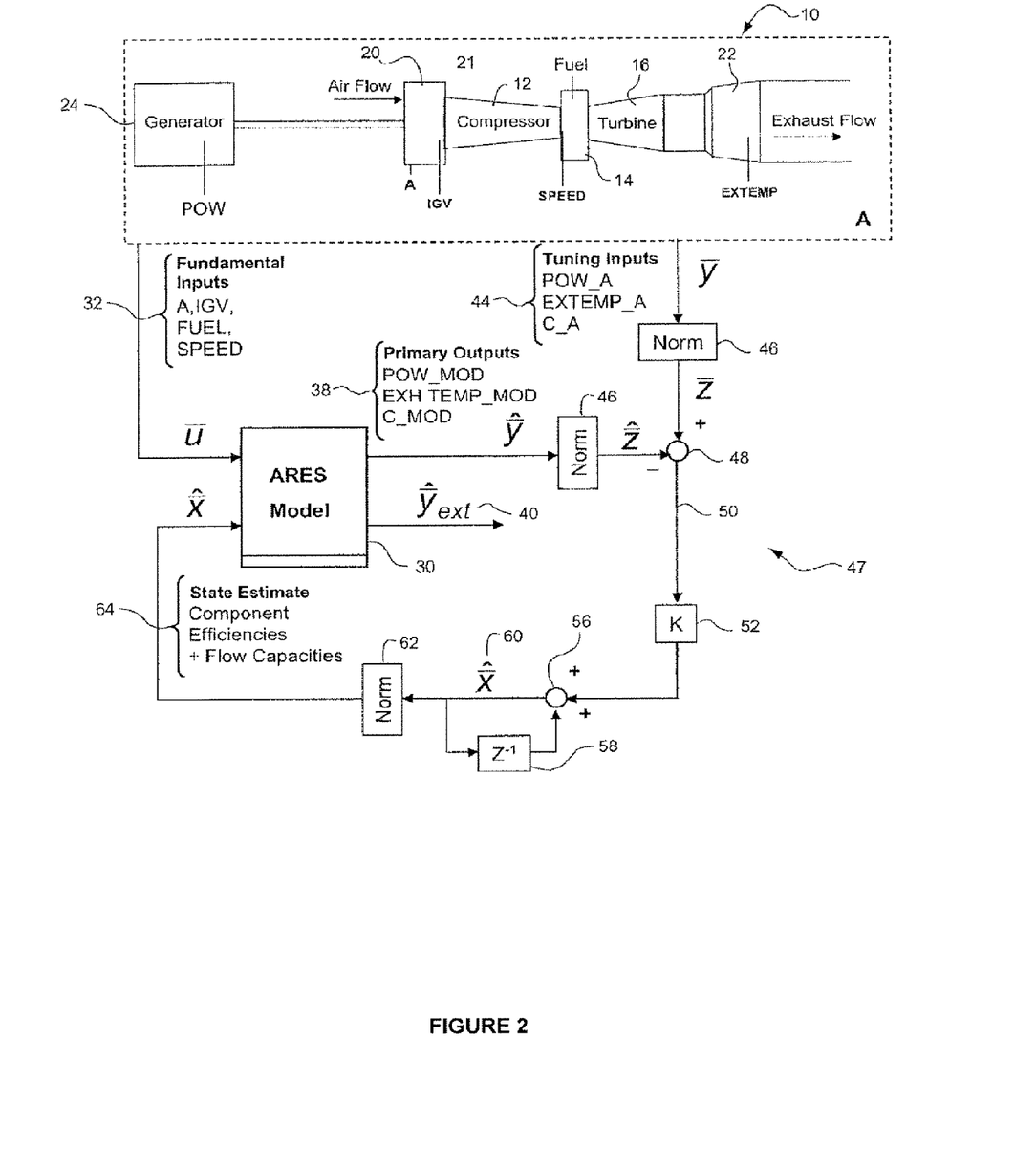
FIG. 2 is an example block diagram illustrating an adaptive turbine model according to an embodiment of the invention.

FIG. 2 is a high-level block diagram of an example turbine 10 and an example adaptive turbine model 30 that mathematically and electronically models, in real time or near-real time, one or more operating parameters of the turbine 10. The turbine 10 may have several observable parameters (or operating parameters) that are referred to as "fundamental inputs" (referenced in FIG. 2 as "$\bar{u}$") 32. These fundamental inputs may be directly measured by sensors and may include, but are not limited to: the ambient conditions (referenced in FIG. 2 as "A"), the angle of the inlet guide vanes (referenced in FIG. 2 as "IGV"), the amount of fuel (referenced in FIG. 2 as "FUEL," and also referenced herein as "fuel flow") flowing to the combustor, and the rotational speed (referenced in FIG. 2 as "SPEED") of the turbine. The listed example fundamental inputs 32 may include other inputs not listed, such as the inlet bleed heat flow (also referenced herein as "IBH"), or the like. The listed fundamental inputs 32 are exemplary and are provided merely to illustrate that sensed inputs are collected. The specific sensed inputs will depend on the control system and available sensors at a particular turbine installation.

The term "fundamental" does not imply that each and every one these measured parameters must be input to the particular embodiment of the adaptive turbine model 30 disclosed herein or that any such adaptive turbine model must have these parameters or inputs. The fundamental inputs 32 to an adaptive turbine model 30 may include some, all, and/or other parameters or inputs. The term "fundamental" merely indicates that for the particular model disclosed herein these inputs are taken from measurements of actual conditions and are applied as inputs to the model.

The fundamental inputs 32 may be applied as inputs to the adaptive turbine model 30 of the turbine 10. These inputs are applied as model inputs to the adaptive turbine model 30 to determine output values (referenced in FIG. 2 as "ŷ") of the adaptive turbine model 30 corresponding to operating parameters of the turbine 10. The model outputs may include primary modeled outputs (referenced in FIG. 2 as "ŷ") 38 that are compared to corresponding measured operating parameters, or tuning inputs, 44 of the turbine 10. The outputs may also include extended modeled outputs (referenced in FIG. 2 as "ŷ ext") 40 that may predict turbine parameters that are not directly measured, for example, but not limited to, the turbine inlet temperature. The extended modeled outputs 40 may be used by the controller 18 to operate the turbine 10, such as by adjusting the actual fuel flow rate (also referenced as "$W_f$") to the combustor, such that the turbine inlet temperature is maintained within design limits.

The primary modeled outputs 38 and their corresponding measured operating parameters 44 are applied to an error correction system 47 that may automatically and regularly tune the adaptive turbine model 30 so that the primary modeled outputs 38 and extended modeled outputs 40 may substantially predict operating conditions of the turbine 10. The primary and extended modeled outputs 38, 40 may be used for controlling the turbine, scheduling maintenance, or predicting the performance of the turbine. Furthermore, the fundamental inputs 32, the primary modeled outputs 38, and/or the extended modeled outputs 40 may be used in an alternate adaptive turbine model to determine operational improvements or alternate operating parameters for the turbine 10 running based on an alternate control strategy.

The primary modeled outputs 38 of the model may be, for example, but not limited to: modeled power output (referenced in FIG. 2 as "POW_MOD") such as to the generator 24, modeled turbine exhaust temperature (referenced in FIG. 2 as "EXHTEMP_MOD"), and modeled compressor conditions (referenced in FIG. 2 as "C_MOD"). The number and particular parameters corresponding to the primary modeled outputs 38 may vary from turbine model to model. Further, the model outputs may vary during operation of the turbine if, for example, a sensor fails the corresponding measured operating parameter 44 is no longer available as a comparison to one of the primary modeled outputs 38.

The primary modeled outputs 38 each correspond to the measured operating parameters (referenced in FIG. 2 as "ȳ") 44, which may be sensed, such as, but not limited to, the actual power output (referenced in FIG. 2 as "POW_A"), the turbine exhaust temperature (referenced in FIG. 2 as "EXTEMP_A"), or the compressor condition (referenced in FIG. 2 as "C_A"). These measured operating parameters 44 may be based on output signals of sensors monitoring the corresponding actual parameter of the turbine 10. Multiple redundant sensors may observe each of the measured operating parameters 44. The measured (or sensed) operating parameters 44 may be selected based on the specific control system for a turbine and available sensors.

Each adaptive turbine model 30 may be a computer generated model of the turbine 10. The adaptive turbine model 30 may be an arrangement of mathematical representations of the primary and extended model outputs, 38, 40. Each of these representations rely on the model input values, for example, the fundamental inputs 32, to determine an estimated value of a model output parameter 38, 40. The mathematical representations act as surrogate parameter values that may be used in circumstances where an measured parameter value is not available. The adaptive turbine models 30 may be physics-based aero-thermodynamic computer models, regression-fit models, neural-network models, or other suitable computer models of a turbine.

The primary modeled outputs 38 are compared to the corresponding measured operating parameter values 44. These measured operating parameters 44 may be referred to as tuning inputs because they may be used to tune the model. The primary modeled outputs 38 and measured operating parameter values 44 are normalized, as shown at blocks 46, to determine normalized modeled outputs (referenced in FIG. 2 as "$\hat{z}$") and normalized measured outputs (referenced in FIG. 2 as "$\bar{z}$"). These normalized outputs are then compared, as shown at block 48. For example, POW_MOD is compared to POW_A, to determine a difference signal 50 ($\Delta(\hat{z}, \bar{z})$), such as ($\Delta$(POW_MOD, POW_A)). The difference signal 50 may indicate an error of the modeled output parameter 38 with respect to the measured actual parameter 44. There may generally be at least one difference signal 50 corresponding to each of the primary modeled outputs 38, and there may be a difference signal corresponding to each of the redundant sensors measuring a particular parameter. At least one measured operating parameter 44, for example, a tuning input, may generally be needed for each primary modeled output 38 to determine a difference signal 50. If one or more of the tuning inputs is not available due to a failed sensor, for example, the corresponding difference signals 50 may not be determined, though the error correction system will still operate to correct the adaptive turbine model 30.

A Kalman filter gain matrix, or KFGM, (referenced in FIG. 2 as "K") 52 may receive as an input the difference signals 50 and may determine corrected and normalized difference signals (referenced in FIG. 2 as "$\hat{x}$") 60 which may be used to tune the gas turbine model 30. The Kalman filter gain matrix 52 applies one or more tuning factors to adjust the difference signals 50 and determine corrected and normalized difference signals 60. The Kalman filter gain matrix 52 relies on the difference signals 60 to tune the adaptive turbine model 30. A relatively large number of difference signals 60, for example, redundant sensor outputs for each of power output, exhaust temperature, and compressor condition, enables the Kalman filter gain matrix to accurately tune the adaptive turbine model 30 and so that the model determines accurate output values, for example, primary and extended modeled output values 38, 40.

The Kalman filter gain matrix 52 may determine one or more tuning factors that are applied to the difference signals 50 to determine normalized correction factor adjustments. The normalized correction factors are summed, as shown at block 56, with the prior normalized correction factor, shown as occurring at block 58, to average out the differences between the current and prior correction factors. The averaged correction factor is un-normalized, as shown at block 62, to produce performance multipliers 64 (also un-normalized correction factors) that may include, for example, but not limited to, component efficiencies and flow capacities. The un-normalized correction factors 64 are then applied to the adaptive turbine model 30 as, for example, multipliers, that are applied to the algorithms that model the turbine 10 and determine the modeled output parameter values 38, 40. The multipliers tune the adaptive turbine model 30 by adjusting the algorithms so that they determine modeled parameter values that accurately represent the actual operation of the turbine. The modeled output values 38, 40 may be applied to determine fuel and air flow to the gas turbine and to determine other control inputs to the gas turbine, or to the gas turbine as it would operate based on an alternate control strategy in the case of the alternate adaptive turbine model 30.

The loss of difference signals 50 may reduce (though may not eliminate) the ability of the Kalman filter gain matrix to tune the adaptive turbine model 30. The adaptive ability of the Kalman filter gain matrix 52 enables it to continue to tune the adaptive turbine model 30 with a reduced set of difference signals 50. To automatically tune the model when one or more of the difference signals is not available, the Kalman filter gain matrix 52 may be modified to account for the loss of a difference signal 50. Accordingly, the turbine can continue to operate and be automatically tuned even when sensors fail and tuning input data regarding observable operating conditions is not available.

Figure 3:
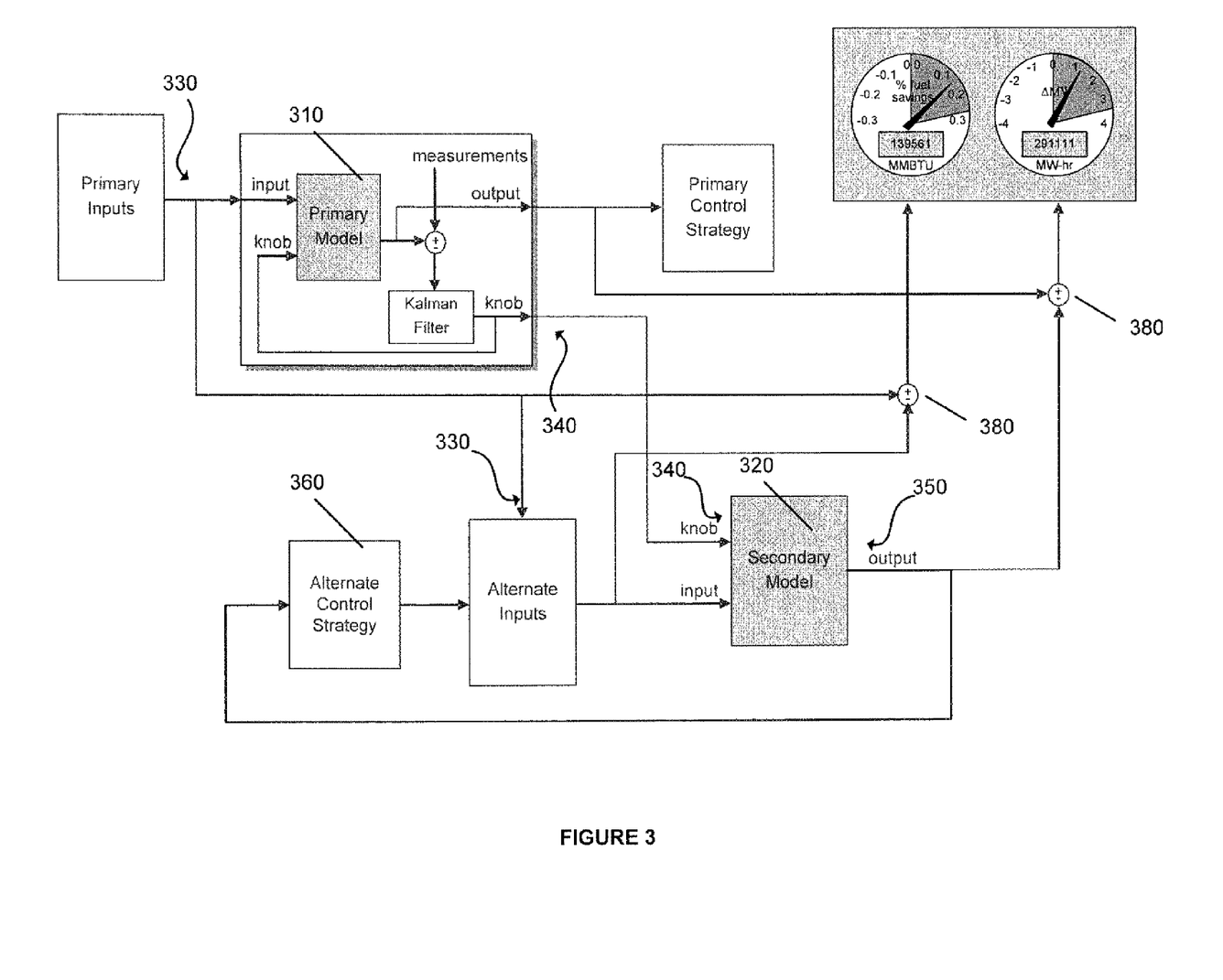
FIG. 3 is an example block diagram illustrating a primary adaptive turbine model and an alternate adaptive turbine model according to an embodiment of the invention.

FIG. 3 is a functional block diagram illustrating an example embodiment of a controller including both a primary adaptive turbine model 310 and an alternate adaptive turbine model 320. The primary, or active, adaptive turbine model 310 and the alternate adaptive turbine model 320 may be configured as described above in reference to FIG. 2. Each of the adaptive models model the same turbine; however, each adaptive model may be configured to operate under different operating conditions and/or under different control strategies. A controller configured to analyze turbine operation by two adaptive models allows for analyzing the turbine, taking into consideration its current operating state, including, for example, its real-time degraded status and the ambient conditions, under conditions or control strategies to which the turbine is not being controlled at that time. Furthermore, because the alternate adaptive turbine model 320 is tuned using the same Kalman-type tuning as the primary adaptive turbine model 310, the alternate adaptive turbine model 320 is also dynamically, or adaptively, tuned to suitably reflect the real-time conditions of the turbine of which it is modeling, just like that of the primary adaptive turbine model 310.

In one example application, the alternate adaptive turbine model 320 applies an alternate control strategy that reflects a different control system configuration than the control system configuration that is currently used to control the actual turbine. For example, the alternate adaptive turbine model 320 may apply the control strategy as was applied based on a legacy control system for the same turbine, prior to the turbine's control strategy being upgraded. Thus, in this example, while the primary adaptive turbine model 310 controls the turbine based on a new, current control strategy after a control system upgrade, the alternate adaptive turbine model 320 allows modeling how the turbine, in its current operating state, would behave based on the previous, legacy control system. In this manner, one may identify the differences between operating behavior of the legacy control system versus the new control system, including its input parameters and its power output, in real-time. For example, when running the turbine at part load, the alternate adaptive turbine model 320 can be adjusted until it models the turbine operating based on the legacy control strategy, producing the same power output. This, for example, can allow identifying the efficiency gains achieved by controlling the turbine based on the new control system as compared to the legacy control system. In another example, when running the turbine at base load and achieving maximum power output, the alternate adaptive turbine model 320 can model what the maximum power output based on the legacy control strategy would have been. Thus, a comparison can be made between the maximum power output capacities of the turbine based on the new control system and the legacy control system. Identifying these operation gains in real-time, or near-real-time, based on the actual, degraded state of the turbine may be beneficial to turbine operators and/or owners that are attempting to identify the likely efficiency gains of upgrading one or more turbines, based on an already upgraded turbine. The operation of the controller having an alternate adaptive turbine model 320 as used in this example embodiment is described more fully below.

In another example embodiment, the turbine controller having an alternate adaptive turbine model 320 may be used to determine where the previous, or legacy, control system would have placed the effectors that control the turbine, or the set limits or constraints placed on the turbine, given the current operating state of the turbine. Knowing the constraints based on the legacy control system allows identifying and setting limits on adjustments based on a known, proven control strategy (as run in the legacy control system). This may be beneficial during the implementation and testing of a new control strategy by providing a comfort zone related to the limits of the turbine based on the previous control strategy, so as to avoid extreme operation or failure of the turbine during testing and implementation.

Further in reference to FIG. 3, the model inputs 330 to the primary adaptive turbine model 310 are also supplied to the alternate adaptive turbine model 320. These model inputs 330, as described above in reference to FIG. 2, may be parameters such as, for example, inlet guide vane, inlet bleed heat, Fuel flow, or the turbine speed. The tuning factors as calculated by the Kalman filter of the primary adaptive turbine model 310, described above in reference to FIG. 2, may act as tuning inputs 340 to the alternate adaptive turbine model 320 to tune the model to accurately reflect the real-time status of the turbine.

The alternate model outputs 350 of the alternate adaptive turbine model 320, which may be, for example, power output, exhaust temperature, or the like, as is further described in detail in reference to FIG. 2, may serve as feedbacks which are factored into the alternate control strategy's boundary limits 360 to determine error terms for control loop closure, as is shown. The alternate control strategy boundary limits 360 may provide limits on operating parameters, such as, for example, exhaust temperature, compressor pressure ratio, and inlet bleed heat flow setpoint. The alternate control strategy boundary limits 360 characterize the boundaries and limits to which the turbine controlled based on the alternate control strategy would be run. Further, in one example, the alternate control strategy boundary limits 360 may be fed into a proportional-integral control loop to close loop on the errors between actual turbine operating parameters and the alternate model parameters. The output of the proportional-integral control loop may then be re-applied to the alternate adaptive turbine model as model inputs 330, and may also be reapplied via another feedback loop to one or more of the alternate control strategy boundary limits 360. Additional inputs may be fed into one of the proportional-integral control loops, other than those coming resulting from the alternate strategy boundary limits 360. For example, the power output from the actual turbine under operation or the power output as modeled by the primary adaptive turbine model 310 may be supplied into a proportional-integral control loop, and then as another input to the alternate adaptive control model 320. This continuous feedback loop—the model inputs 330 and the tuning inputs 340 of the primary adaptive turbine model 310 fed to the alternate adaptive turbine model 320, with the alternate model outputs 350 being supplied via a feedback loop to one or more alternate control strategy boundary limits 360 and, optionally, proportional-integral control loops, and then back to the alternate adaptive turbine model 320 as model inputs—allows operating parameters and output parameters of the actual turbine during operation to be compared to those parameters as they would exist if the turbine operated based on the alternate control strategy.

One or more of the parameters modeled by the alternate adaptive turbine model 320 may be compared to one or more of the parameters of the actual turbine or one or more parameters modeled by the primary adaptive turbine model at the comparator function or functions 380. The comparator function or functions 380 may determine comparison data, for example, an output associated with fuel savings or power difference, such as percent fuel savings or percent power difference, for display to the user, or for writing to a memory on or associated with the controller or with some other computer-based device associated with turbine control.

Figure 4:
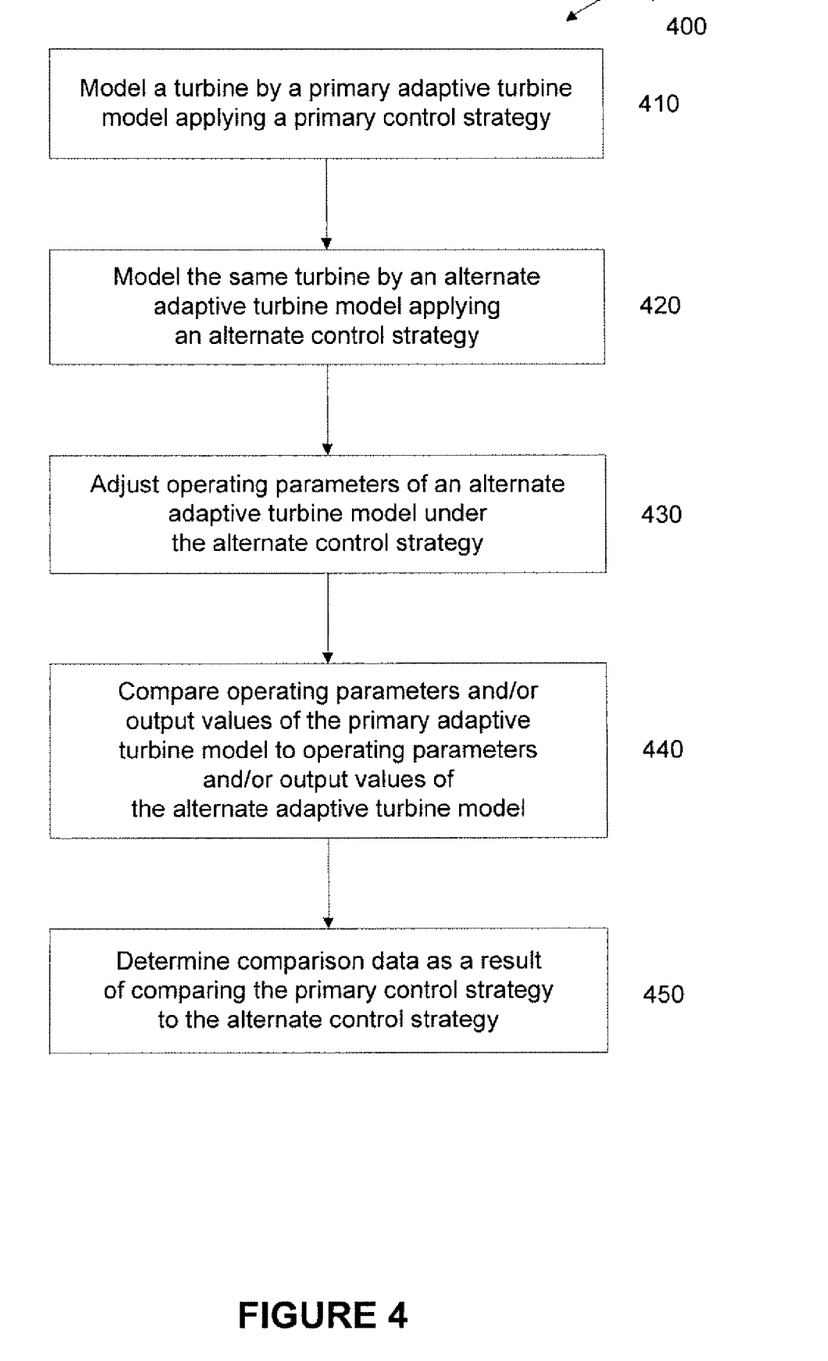
FIG. 4 is an example flowchart illustrating a method for controlling and modeling a turbine that includes an alternate control strategy according to an embodiment of the invention.

FIG. 4 illustrates, by way of a flow diagram 400, a general example of a turbine operating with a primary adaptive turbine model and further applying an alternate adaptive turbine model, as described above with reference to FIG. 3. At block 410 a primary adaptive turbine model is provided. The primary adaptive turbine model may be controlled to a primary control strategy, which may reflect, for example, an upgraded control system or a control strategy intended for use under certain operating conditions. Block 420 follows block 410, in which an alternate adaptive turbine model is provided, modeling the same turbine as the primary adaptive turbine model. Block 430 follows block 420, in which the parameters of the alternate adaptive turbine model may be adjusted based on an alternate control strategy, different than that as applied in the primary adaptive turbine model. They may be adjusted in response, at least partially, to the one or more output values of the primary adaptive turbine model. For example, at part load, the fuel flow of the alternate adaptive turbine model may be adjusted until the power output of the alternate adaptive turbine model matches the power output of the actual turbine under operation as controlled by the primary adaptive turbine model. Accordingly, adjusting the fuel flow may require adjusting other operating parameters of the alternate adaptive turbine model, such as inlet guide vane or inlet bleed heat, as determined based on the alternate control strategy boundary limits. Block 440 follows block 430, in which the operating parameters, for example the fuel flow, of the primary adaptive turbine model are compared to the operating parameters of the alternate adaptive turbine model, allowing the determination of comparison data, as at block 450. In another embodiment, the output values, for example an output associated with power output, of the primary adaptive turbine model are compared to the operating parameters of the alternate adaptive turbine model at block 440.

Block 450 follows block 440, in which the comparison data is determined, which may illustrate, for example, the savings in fuel when operating the turbine based on the primary (or new/upgraded) control strategy as compared to operating the turbine based on the alternate (or old/legacy) control strategy to achieve the same power output at part load. In another example, the comparison data, determined at block 450, may illustrate the differential in maximum power output of the turbine operating based on the primary (or new/upgraded) control strategy as compared to operating the turbine based on the alternate (or old/legacy) control strategy when operating at base load. It is further appreciated that the comparison data may be a combination of these comparisons—fuel savings, differential power gain—as well as comparing other operating parameters or turbine characteristics between the actual operation of the turbine based on the existing, or primary, control strategy compared to the hypothetical (modeled) operation of the turbine based on a different, or alternate, control strategy.

Figure 5:
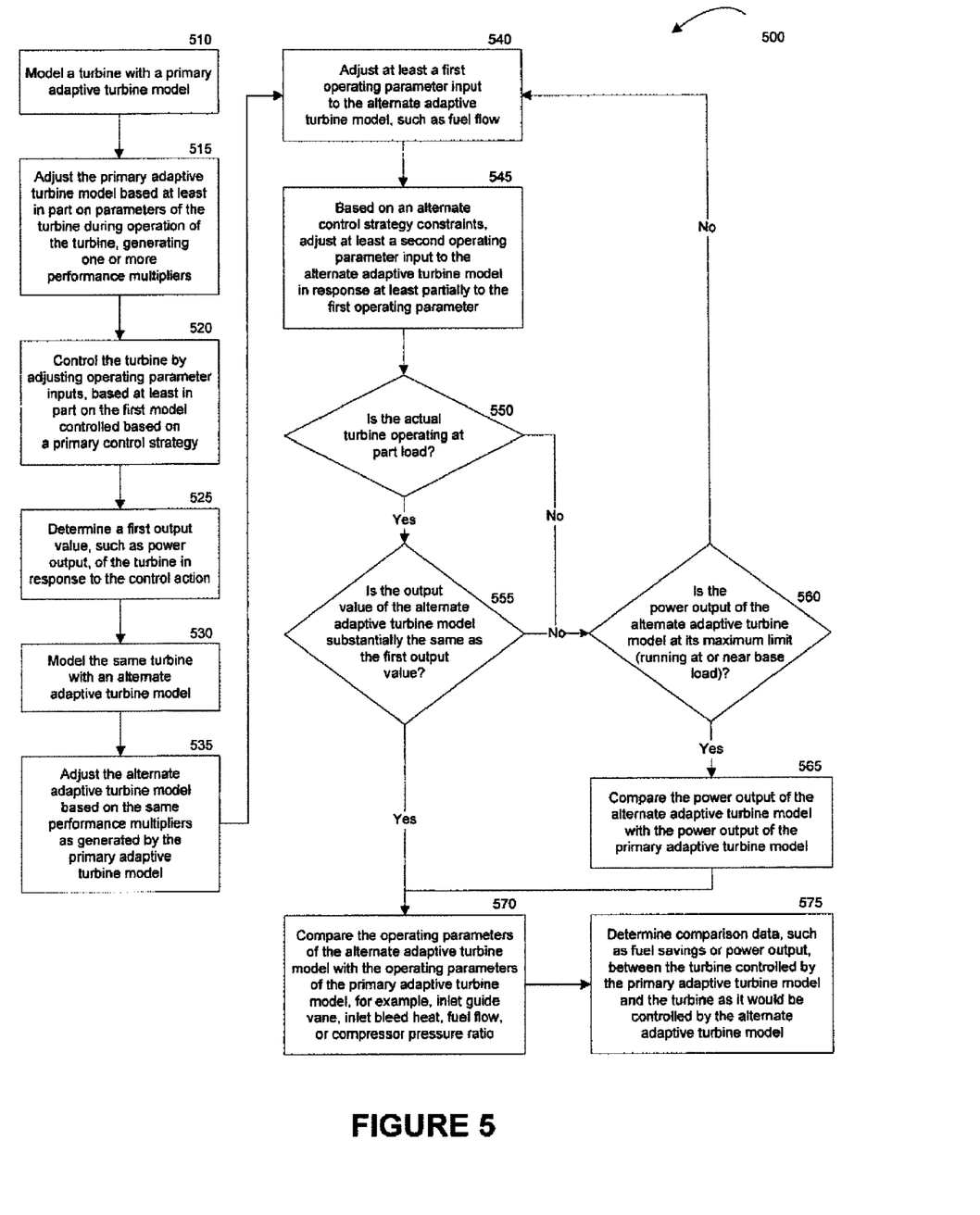
FIG. 5 is an example flowchart illustrating a method for controlling and modeling a turbine that includes an alternate control strategy according to an embodiment of the invention.

FIG. 5 illustrates, by way of a flow diagram 500, a more detailed example of operating a turbine having a primary adaptive turbine model and an alternate adaptive turbine model. At block 510, the primary adaptive turbine model is provided for, as described in greater detail above in reference to FIG. 2. The primary adaptive turbine model may be configured to assist in controlling the turbine operation based on the actual, or primary, control strategy, as intended during operation.

Block 515 follows block 510, in which the primary adaptive turbine model is adjusted (or tuned) based on operating parameters (which may be parameters that are directly sensed or which may be based on modeled parameters that may not be sensed) of the turbine during operation. Block 515 provides for tuning the primary model, for example, with the use of a tuning algorithm or algorithms, such as a Kalman filter, as described above in detail. As a result of the adjusting (or tuning), one or more performance multipliers may be determined, as is discussed in more detail with reference to FIG. 2. These performance multipliers may be used to tune the adaptive turbine models (the primary and the alternate) to adjust the turning algorithms so the parameters model those in the actual turbine.

Block 520 follows block 515, in which the turbine may be controlled based at least in part on the primary adaptive turbine model based on a primary control strategy. For example, the turbine may be controlled to operate at part load or at or near base load. At part load, the turbine operating parameters, by way of the primary adaptive turbine model, are set to provide a specific power output of the turbine. In another example, at or near base load, the turbine operating parameters are set to operate the turbine to produce its maximum power output.

Block 525 follows block 520, in which a first output value, such as the power output during the part load example, or the fuel flow during base load, may be determined for later comparison. In other embodiments, the output value may be other operating parameters, such as, for example, inlet guide vane, inlet bleed heat, fuel flow characteristics, or the like, which may vary by turbine implementation and model configuration.

Block 530 follows block 525, which illustrates modeling the same turbine with an alternate adaptive turbine model, and controlling it based on an alternate control strategy, as described above in reference to FIGS. 2-3. Block 535 follows block 530, in which the alternate adaptive turbine model is adjusted (or tuned) based on the same performance multipliers as determined at block 515, above. The steps illustrated by block 535 may identically or closely reflect those steps as occurring at block 515 so the alternate adaptive turbine model is tuned like the primary adaptive turbine model.

Blocks 540-560, following block 535, illustrate the continuous feedback process as described in reference to FIG. 3, whereby parameters of the alternate adaptive turbine model may be adjusted until they either match those of the primary adaptive turbine model or until they model the turbine operating based on the alternate control scheme at base load (producing its maximum power output based on that control strategy). A first adjustable operating parameter of the alternative adaptive turbine model, such as fuel flow, may be adjusted at block 540 in an attempt to achieve the same operation as the primary adaptive turbine model. Block 545 follows block 540, in which a second operating parameter or parameters of the alternative adaptive turbine model may be adjusted (in some examples automatically) in response to adjusting the first operating parameters. For example, after adjusting fuel flow in an attempt to reach the desired power output the inlet guide vane or inlet bleed heat parameters may be adjusted accordingly, based on the limitations imposed by the alternate control strategy boundary limits.

Block 550 which follows block 545 illustrates that if the actual turbine is operating at part load, the model output values of the alternate adaptive turbine model and the power output of the adaptive turbine model are controlled (by closing loop on the error between the two) to match that of the primary turbine model, and then compared (by way of this loop illustrated in FIG. 5). However, at block 550, if the actual turbine is running at or near base load, the alternate adaptive turbine model is adjusted to also run at or near its base load profile, and at least the power output of the two are compared, and optionally the other operating parameters may be compared.

Block 555 follows the "yes" path from block 550, in which the output value of the alternate adaptive turbine model is compared with the first output value of the actual turbine running at part load, for example the power output, as determined at block 525, to determine if they are matching or substantially similar—and thus that the alternate adaptive turbine model is effectively modeling the same or similar operation as the actual turbine during operation. If they are not the same (and the alternate adaptive turbine model is not modeling operation at its maximum capacity as determined at block 560) then blocks 540-560 are repeated until they are matching. The repeated loop between blocks 540-560 illustrates the feedback loop process as more fully described in reference to FIG. 3.

Block 560, which follows the "no" path of block 550 and the "no" path of block 555, illustrates two examples—one, when the actual turbine is running at part load, and another, when the actual turbine is running at or near base load. In the first example, being that in which the actual turbine is running at part load, block 560 determines whether the output power of the actual turbine is equal to or greater than the maximum power output as would be modeled by the alternate adaptive turbine model based on the alternate control strategy. In this example, if the modeled power output of the alternate adaptive turbine model is maximized, or substantially maximized, the power output of the alternate model is captured for comparison to the actual turbine power output (at block 565). In the second example, the actual turbine is operating at or near base load (as determined at block 550) and the alternate adaptive turbine model is being adjusted (by way of the loop) to run at, or substantially at, its maximum power output also. When the alternate adaptive turbine model is operating at its maximum power output (modeling base load based on the alternate control strategy), the power output of the alternate model may be compared to the power output of the actual turbine, as illustrated at block 565.

Block 570 follows the "yes" path of block 555 and follows block 565, illustrates that when either the alternate model output matches the actual turbine output, or both the actual turbine and the alternate model are operating at or near base load, the operating parameters of the actual turbine, or the operating parameters of the primary adaptive turbine model, may be compared to the operating parameters of the alternate adaptive turbine model. For example, the fuel flow of the alternate model may be compared to the fuel flow of the actual turbine operating at the same condition, to determine what fuel savings may have been achieved by operating based on the actual (new/upgraded) control strategy as compared to the alternate control strategy. In other examples, other operating parameters, such as the inlet guide vane, the inlet bleed heat, the fuel flow, or the compressor pressure ratio, or the like, may be compared.

Finally, at block 575, which follows block 570, comparison data may be determined or otherwise generated. The comparison data may be displayed, or it may be written in memory for later and/or subsequent access. For example, fuel savings may be displayed, showing the fuel savings based on the new control strategy when comparing the fuel flows between the primary and alternate models. Also, when running at or near base load (or when the alternate model reaches its maximum power output), the power difference may be displayed to indicate the increased power output at or near base load when compared to the alternate control strategy. These may be displayed via an interface indicating, for example, raw numbers, graphic display using graphing techniques, graphic display showing percentage differences, or the like. In some examples, the data may also (or instead) be stored in a database, or other memory device, allowing for the production of historical comparison data over time.

References are made to block diagrams of systems, methods, apparatuses, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the inven- That which is claimed is:

1. A method for controlling and modeling a turbine, comprising:
   modeling the turbine by a primary adaptive turbine model comprising at least one primary operating parameter;
   modeling the turbine by an alternate adaptive turbine model comprising at least one alternate operating parameter;
   determining a first output value from the primary adaptive turbine model that is associated at least in part with operation of the turbine based on a primary control strategy;
   adjusting the at least one alternate operating parameter based on an alternate control strategy and based at least in part on the first output value; and
   determining comparison data based at least in part on a comparison between the primary control strategy and the alternate control strategy.

2. The method of claim 1, further comprising:
   tuning the primary adaptive turbine model by adjusting the at least one primary operating parameter based at least in part on a tuning algorithm based at least in part on the operating state of the turbine; and
   tuning the alternative adaptive turbine model by adjusting the at least one alternate operating parameter also based at least in part on the tuning algorithm.

3. The method of claim 2, wherein the tuning algorithm comprises a Kalman filter.

4. The method of claim 1, wherein:
   the at least one primary operating parameter comprises at least one of fuel flow, inlet guide vane, or inlet bleed heat of the turbine; and
   the at least one alternate operating parameter comprises at least one of fuel flow, inlet guide vane, or inlet bleed heat of the alternate adaptive turbine model.

5. The method of claim 1, wherein the first output value comprises power output of the turbine.

6. The method of claim 1, wherein:
   the turbine is operating at part load;
   adjusting the at least one alternate operating parameter is performed until a second output value of the alternate adaptive turbine model substantially equals the first output value of the primary adaptive turbine model; and
   determining comparison data occurs after the second output value substantially equals the first output value.

7. The method of claim 6, wherein determining comparison data comprises:
   comparing a first fuel flow of the primary adaptive turbine model to a second fuel flow of the alternate adaptive turbine model; and
   determining an output associated with fuel savings.

8. The method of claim 1, wherein:
   the turbine is operating at about base load; and
   adjusting the at least one alternate operating parameter is performed until the alternate adaptive turbine model models the turbine operating at about base load based on the alternate control strategy; and
   the determining comparison data occurs after the alternate adaptive turbine model models the turbine operating at about base load.

9. The method of claim 8, wherein the determining comparison data comprises:
   comparing the power output of the turbine to the power output of the alternate adaptive turbine model; and
   determining an output associated with power difference.

10. The method of claim 1, further comprising presenting some or all of the comparison data to a user.

11. The method of claim 1, further comprising storing some or all of the comparison data in a memory.

12. A turbine control and modeling system stored in computer-readable memory, comprising:
    a primary adaptive turbine model operable to model operation of a turbine, wherein the primary adaptive turbine model comprises at least one primary operating parameter; and
    an alternate adaptive turbine model operable to model operation of the turbine, wherein the alternate adaptive turbine model comprises at least one alternate operating parameter;
    wherein the system is operable to:
        determine a first output value from the primary adaptive turbine model that is associated at least in part with operation of the turbine based on a primary control strategy;
        adjust the at least one alternate operating parameter based on an alternate control strategy and based at least in part on the first output value; and
        determine comparison data based at least in part on a comparison between the primary control strategy and the alternate control strategy.

13. The system of claim 12, wherein:
    the primary adaptive turbine model is tuned by adjusting the at least one primary operating parameter based at least in part on a tuning algorithm based at least in part on the operating state of the turbine; and
    the alternative adaptive turbine model is tuned by adjusting the at least one alternate operating parameter based at least in part on the tuning algorithm.

14. The system of claim 13, wherein the tuning algorithm comprises a Kalman filter.

15. The system of claim 12, wherein:
    the at least one primary operating parameter comprises at least one of fuel flow, inlet guide vane, or inlet bleed heat of the turbine; and
    the at least one alternate operating parameter comprises at least one of fuel flow, inlet guide vane, or inlet bleed heat of the alternate adaptive turbine model.

16. The system of claim 12, wherein the first output value comprises power output of the turbine.

17. The system of claim 12, wherein the at least one primary operating parameter comprises fuel flow and the at least one alternate operating parameter comprises fuel flow, and when the turbine is operating at part load:
    the system is operable to adjust at least the fuel flow alternate operating parameter based on the alternate control strategy until power output of the alternate adaptive turbine model substantially equals power output of the primary adaptive turbine model;
    the system is operable to compare the fuel flow primary operating parameter with the fuel flow alternate operating parameter after determining power output of the alternate adaptive turbine model substantially equals power output of the primary adaptive turbine model; and the system determines comparison data comprising an output associated with fuel savings.

18. The system of claim 12, wherein the at least one primary operating parameter comprises primary fuel flow and the at least one alternate operating parameter comprises alternate fuel flow, and when the turbine is operating at base load:

the system is operable to adjust at least the alternate fuel flow based on the alternate adaptive turbine model until the alternate adaptive turbine model models the turbine operating at about base load; and the system is further operable to compare power output of the turbine to power output of the alternate adaptive turbine model, wherein the system determines comparison data comprising an output associated with power difference.

19. A method for controlling and modeling a turbine, comprising:

modeling the turbine using a primary adaptive turbine model comprising at least one primary operating parameter;

modeling the turbine using an alternate adaptive turbine model comprising at least one alternate operating parameter; and tuning the primary adaptive turbine model and the alternate adaptive turbine model;

wherein when the turbine is operating at about part load based on a primary control strategy, the at least one alternate operating parameter is adjusted to determine an alternate power output based on an alternate control strategy substantially equal to the turbine power output, and the at least one primary operating parameter is compared to the at least one alternate operating parameter;

wherein when the turbine is operating at about base load based on the primary control strategy, the at least one alternate operating parameter is adjusted to determine an alternate maximum power output based on the alternate control strategy, and a maximum turbine power output associated with the turbine is compared to the alternate maximum power output.

20. The method of claim 19, further comprising determining comparison data comprising at least one of an output associated with fuel savings comparing fuel usage by the turbine to fuel usage modeled by the alternate adaptive turbine model, or an output associated with power difference comparing power generated by the turbine to power modeled by the alternate adaptive turbine model.

* * * * *